E. C. LOVELL.
MACHINE FOR LABELING PACKETS, TINS, OR THE LIKE.
APPLICATION FILED JUNE 6, 1908.

948,061.

Patented Feb. 1, 1910.
11 SHEETS—SHEET 1.

Fig. 1.

Witnesses:
S. Newman
H. D. Penney

Inventor:
Edward C. Lovell,
By his Attorney,
F. H. Richards.

E. C. LOVELL.
MACHINE FOR LABELING PACKETS, TINS, OR THE LIKE.
APPLICATION FILED JUNE 6, 1908.

948,061.

Patented Feb. 1, 1910.
11 SHEETS—SHEET 3.

Witnesses:
S. Newman
H. D. Penney

Inventor:
Edward C. Lovell,
By his Attorney,
F. A. Richards

E. C. LOVELL.
MACHINE FOR LABELING PACKETS, TINS, OR THE LIKE
APPLICATION FILED JUNE 6, 1908.

948,061.

Patented Feb. 1, 1910.

Witnesses:
S. Newman
H. D. Penney

Inventor:
Edward C. Lovell,
By his Attorney,
F. H. Richards

E. C. LOVELL.
MACHINE FOR LABELING PACKETS, TINS, OR THE LIKE.
APPLICATION FILED JUNE 6, 1908.

948,061.

Patented Feb. 1, 1910.
11 SHEETS—SHEET 8.

Witnesses:
S. Shuman
H. D. Penney

Inventor:
Edward C. Lovell
By his Attorney,
F. H. Richards

E. C. LOVELL.
MACHINE FOR LABELING PACKETS, TINS, OR THE LIKE.
APPLICATION FILED JUNE 6, 1908.

948,061.

Patented Feb. 1, 1910.

Witnesses:
Skwman
H. D. Penney

Inventor:
Edward C. Lovell,
By his Attorney, F. H. Richards

UNITED STATES PATENT OFFICE.

EDWARD COLSTON LOVELL, OF BRISTOL, ENGLAND.

MACHINE FOR LABELING PACKETS, TINS, OR THE LIKE.

948,061. Specification of Letters Patent. Patented Feb. 1, 1910.

Application filed June 6, 1908. Serial No. 437,053.

*To all whom it may concern:*

Be it known that I, EDWARD COLSTON LOVELL, a subject of the King of Great Britain, residing in the city of Bristol, England, have invented certain new and useful Improvements in Machines for Labeling Packets, Tins, or the Like, of which the following is a specification.

This invention relates to an improved machine for labeling packets, tins or the like and it has for its object to produce a machine for applying a label to a packet, in which an ungummed label is taken from a magazine by a gumming device and placed upon a support whereby it is carried into the path of the packet which is taken from a receptacle and pressed thereon partly folding the said label around the packet, the final folds being afterward made by horizontally reciprocating folders which alternately advance coming into contact with the upstanding portions of the label and pressing it down on to the packet the latter being then withdrawn.

In order that the invention may be the better understood, drawings are appended in which:—

Figs. 13. to 19. are views illustrating various stages in the labeling of the packet or the like.

Referring to the accompanying drawings 1. indicates generally the frame of the machine carrying a plate 2. upon which are mounted the various devices for effecting the operations incidental to the placing of the label around the packet.

3. Fig. 2. indicates bearers arranged across the end of the frame and upon which are formed bearings for the main shaft 13 provided at one end with fast and loose pulleys, and at the other with a pinion 4. engaging a pinion 5. secured to a cam shaft 6. This latter shaft 6. is supported in bearings formed upon brackets 7 Figs. 1 and 2 secured to cross members such as 8 Fig. 2 at each end of frame 1. The shaft 6 is also provided with a bevel wheel 9. which engages a second bevel wheel 10 secured to the end of a second cam shaft 11. arranged at right angles to the shaft 6. before referred to. The shaft 11. is supported in bearings formed on brackets 12 both of which are shown in dotted lines in Fig. 1. and one of said brackets is shown in Fig. 2. Both the brackets are supported upon a bearer 121. arranged transversely of the machine and secured at its ends to longitudinal members 13¹. on each side of the frame as shown in Fig. 2.

Figure 7:
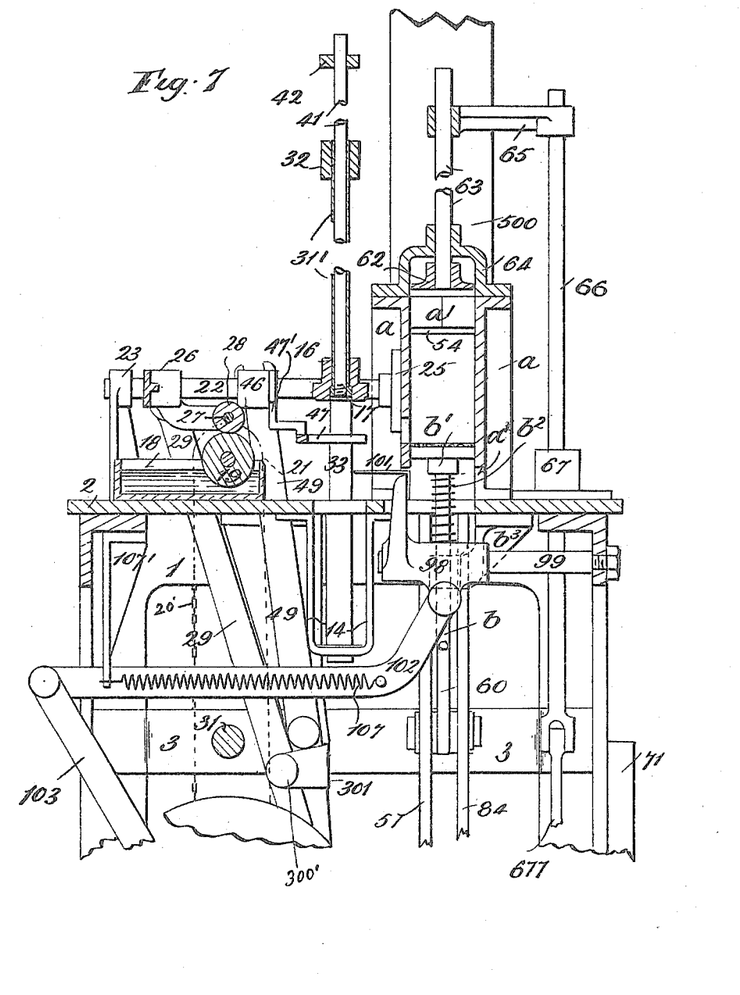
Fig. 7. is a section on line A A Fig. 3.
Figures 8, 9, 10, 11, 12:
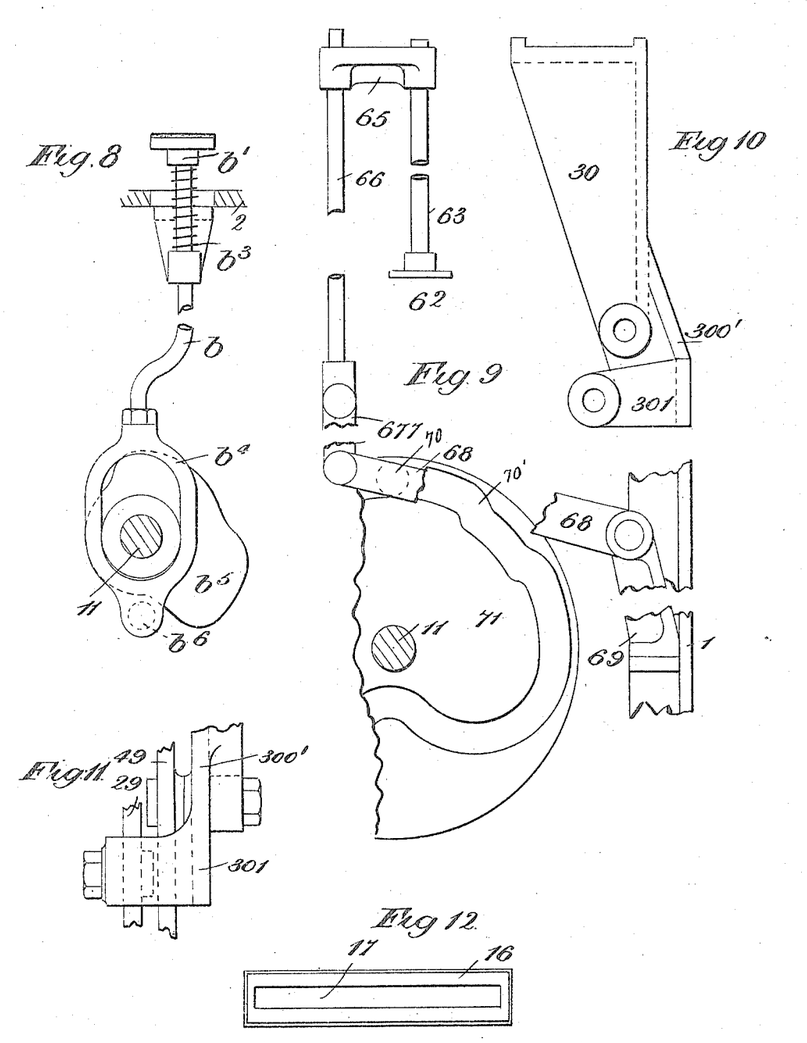
Fig. 8. is a side elevation of the support for the packet during the folding operations together with the operative mechanism therefor.
Fig. 9. is a side view showing the operative mechanism of the plunger whereby the packet or the like is placed upon the support shown in Fig. 8.
Fig. 10. is a side elevation of one of the brackets supporting the levers operating the label carrier and the gum distributing roller.
Fig. 11. is a back view of the lower end of the bracket shown in Fig. 10.
Fig. 12. is a plan of the underside of the gummer.
Figure 13:
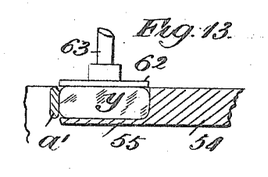
Figure 14:
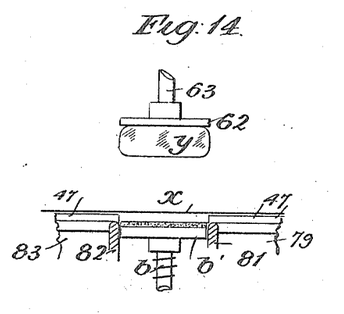
Figure 22:
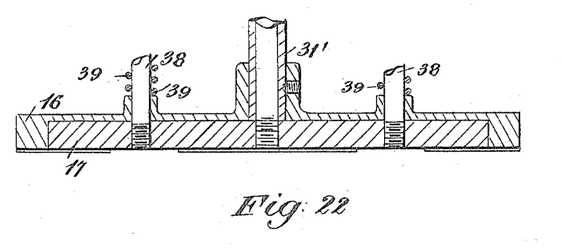
Fig. 22. is a longitudinal section of the gummer with the stripper for removing the label from said gummer.
Figures 23, 24:
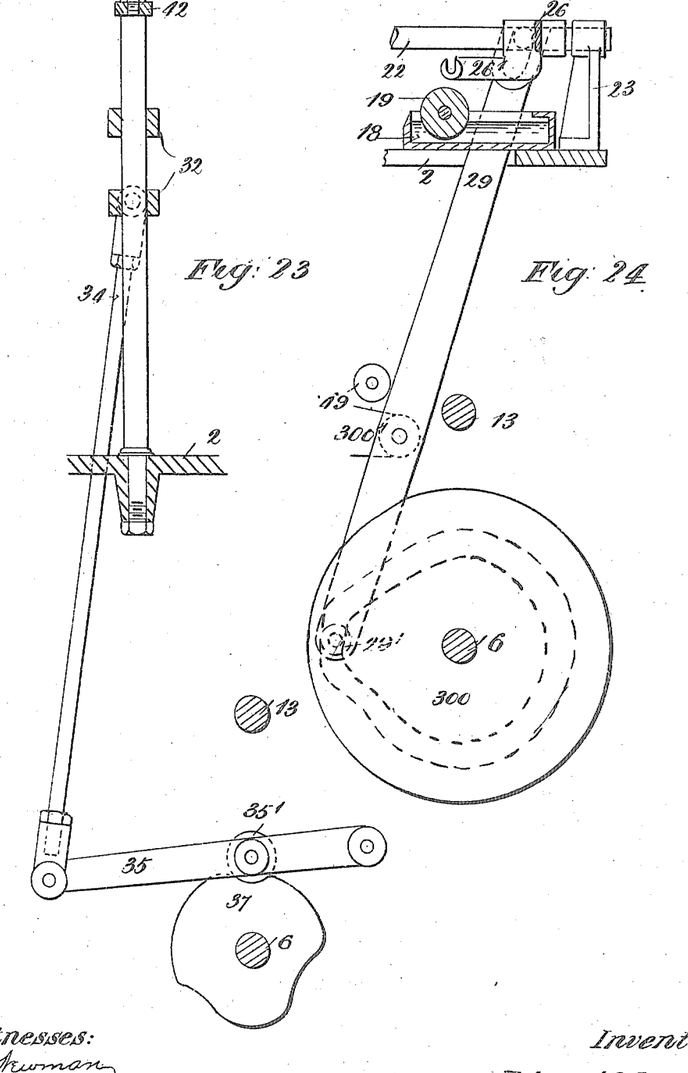
Fig. 23. is a sectional view showing one of the operating levers and its cam whereby the movement of the bridge carrying the gummer is effected.
Fig. 24. is a similar view to a somewhat larger scale showing one of the levers for effecting the reciprocation of the frame carrying the gum distributing roller.

The ungummed labels are contained in a magazine arranged below the table said magazine being formed of a number of sheet metal strips 14. bent to form a basket or open frame provided with a plate 15 upon which the labels are supported. The labels are removed from the frame by means of a gummer 16. Figs. 7 and 12 and 22. and which gummer is caused to descend on to the uppermost of the labels in the magazine, and upon the return or upward movement of the gummer the label is removed. As will be seen on reference to Figs. 7, 12 and 22. the gummer is formed in two parts, one contained within the other and the outer 16. being preferably of somewhat greater depth or thickness than the inner part 17. so as to provide a marginal surface to which the gum is applied. The contour of the gummer is in accordance with the shape of the label, which label in the present instance comprises a long and substantially narrow band of sufficient length to enable it to encircle the packet with the ends overlapping. The gummer therefore upon contact with the label provides it with a gummed margin. The gum is contained in a reservoir 18 secured to the plate 2. and is removed therefrom by means of a roller 19. which is continuously driven from the cam shaft 6. by means of a chain wheel 20. shown in dotted lines Figs. 1 and 2 around which passes a chain transmitting motion from the said shaft 6. to the roller by means of a second chain wheel 21. secured to the end of the spindle of roller 19. and around which the chain also passes. The chain is omitted from Fig. 1. but is indicated partly in full in Fig. 2 and by dotted lines $20^1$ in Fig. 7. as is also the chain wheel 21 attached to the spindle of roller 19.

Figure 1:
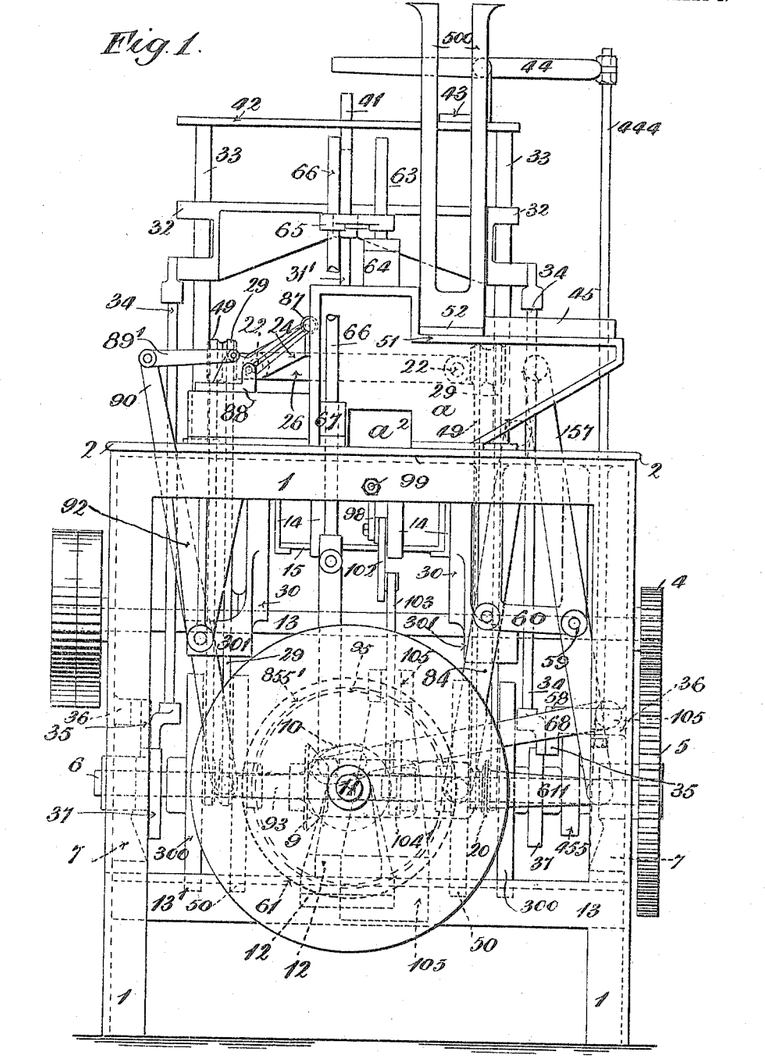
Figure 1. as a front elevation of the improved machine.
Figure 2:
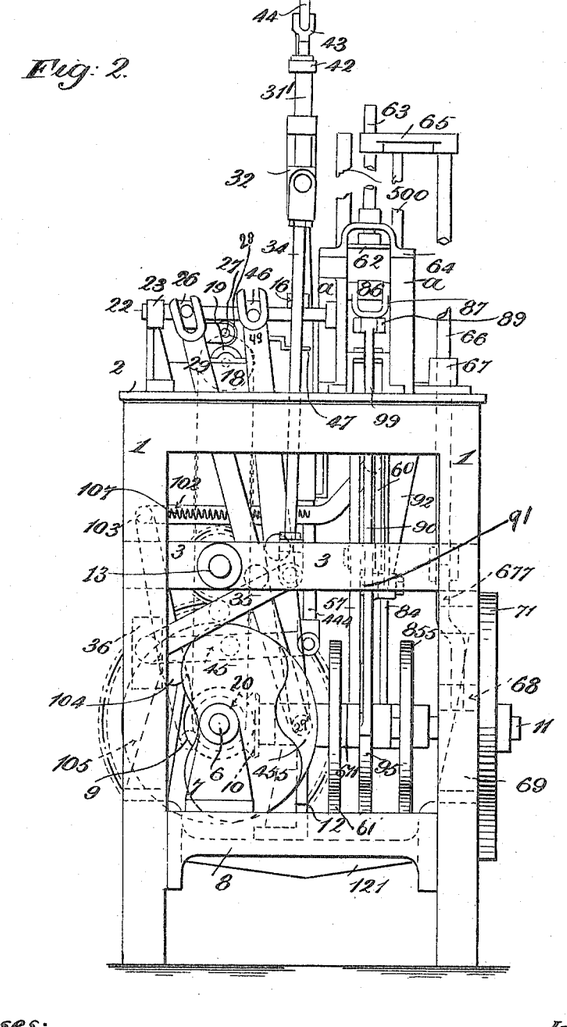
Fig. 2. is an end elevation.
Figure 3:
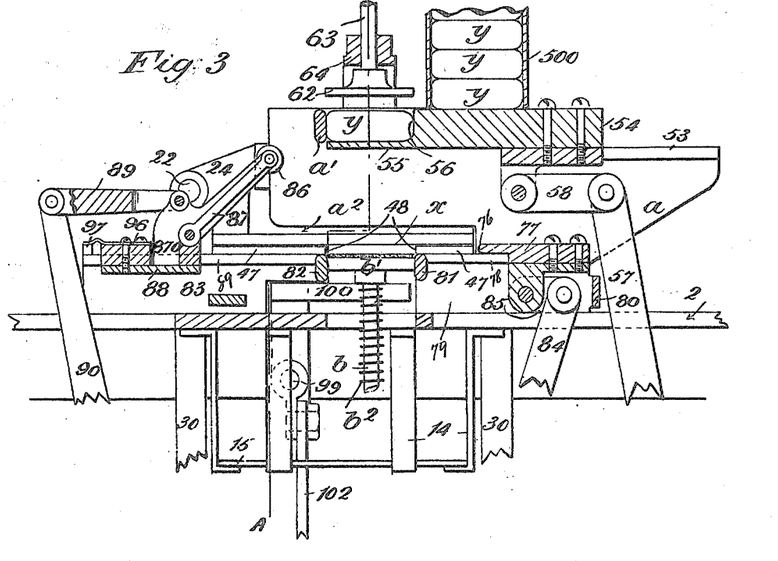
Fig. 3. is a section to an enlarged scale showing the arrangement of the folders for effecting the final folds.
Figure 6:
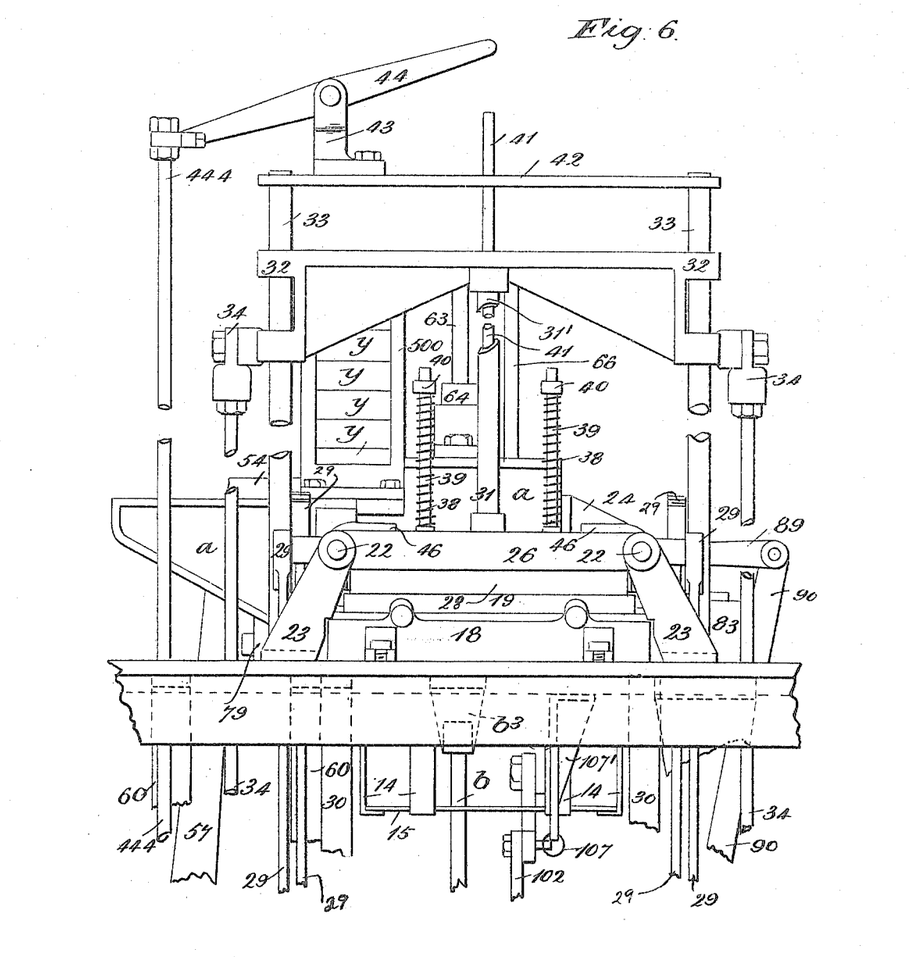
Fig. 6. is a back view to an enlarged scale with the operating cams omitted.

22 indicates horizontal rods see Figs. 1, 2, 3, 5, 6, 7, 20, and 24 and of which one is supported at one end by means of a bracket 23. secured to plate 2 and at the opposite end, by the angle bracket 24. Figs. 3 and 6 which bracket is secured at one end to plate 2. and at the other bolted to the frame $a$ which will hereafter be more fully described. The other rod 22 is supported at one end by a bracket 23 and at the other by the bracket 25 Figs. 6 and 7 also bolted to the said frame $a$. The rods are disposed one on each side of the gum reservoir 18 and form guides for the cross bar 26 indicated by dotted lines in Fig. 1. and shown in Figs. 2, 5, 6, 7, 20 and 24. which bar at its end has secured to it horizontal arms $26^1$ having bearings carrying the spindle 27. of a roller 28. which roller rests upon roller 19 and as the bar is moved forward it carries gum from the roller 19. and applies it to the undersurface of the gummer 16. The position of the gummer 16 when in its intermediate position is such that its aforesaid undersurface is in line with the upper part of the periphery of the roller 28. The movement of the crossbar 26. is effected by means of a pair of levers 29. each of which engages a pin projecting from the end of the cross bar and which levers are fulcrumed in the bracket 30 Figs. 1, 3, 6, 7, 10, 11, and 24. two of such brackets being bolted to the underside of the plate 2. The levers 29 at their lower ends are operated by disks 300 secured to the shaft 6, see Figs. 1 and 24, and having suitable races formed in the sides with which engage rollers $29^1$ Fig. 24. upon the ends of levers 29.

As aforesaid the gummer 16 is formed in two parts; of which the outer part 16 is secured to the lower end of a hollow vertical rod $31^1$ attached at its upper end to a bar 32 sliding upon vertical guides 33 secured to a plate 2. At each end the bar 32 has pivotally connected to it the upper end of a rod 34 the lower end of said rods being each secured to one end of levers 35 shown in Figs. 1, 2, and 23, which lever is at one end pivotally secured to a bracket 36, secured to the side vertical members of frame 1. The lever 35 is provided with a roller $35^1$ see Fig. 23. bearing upon a cam 37 two of which cams are mounted upon the shaft 6 one for each of the levers 35. The contour of the cam is such that the gummer having received a supply of gum is lowered with its inner member until its further movement is checked by coming into contact with the uppermost label, the throw of the cam being sufficient to lift it through a distance equal to the depth of the receptacle. It is then raised a certain distance until in a position to be clear of the label carrier when same is advanced to a position beneath it, when the inner portion of the gummer is depressed, removing the label and placing it upon the carrier by which upon the raising of the gummer it is taken into a position such that it is ready to be applied to the packet.

The part 17, hereinafter for convenience of description referred to as the stripper is held in position by means of the rods 38. which pass through bosses in the outer part and are screwed at their lower ends into the part 17. and have encircling them springs 39. which abut at their ends respectively against the collars 40. on the rods 38 and the upper surface of the gummer. Also tapped into the stripper is the lower end of a rod 41. passing through the hollow rod $31^1$ and at its upper end passing through the bar 42. secured to the upper end of the vertical guide rods 33. aforesaid, as clearly shown in Fig. 23. Secured to the bar 42. is a bracket 43. see Figs. 1, 2, 5 and 6, on which is mounted a lever 44. one end of which is disposed adjacent to the upper end of the rod 41. while the opposite end has secured to it the upper end of a rod 444. the lower end of which rod is connected to a lever 45. pivotally mounted upon the pin carrying the right hand side lever 35. for actuating the rods 34. operating the gummer. The lever 45 is actuated from the shaft 6 by means of a disk 455. having a cam race said disk being shown in Figs. 1 and 2. The general arrangement of the parts just described is such that at a predetermined moment the lever 44 is caused to depress the rod 41. against the action of the springs 39 so as to free or strip the label from the gummer.

Mounted upon the guide rods 22. aforesaid and arranged in front of the bar carrying the gum distributing roller is a cross bar 46. (see Figs. 2, 5, 6, 7, and 20) carrying a horizontally disposed plate 47 of a cross sectional outline shown in Figs. 2 and 7 and which plate is cut away at $47^1$ for the passage of the roller 28 and is substantially the length of the label, being provided with an opening at 48. which is somewhat in excess of the length of the packet indicated in the various views by the letter $y$. The width of the plate is equal to the width of the label and the said label is deposited when stripped from the gummer upon the plate which serves as a carrier for it and by which it is taken into a position ready for application to the packet. The carrier, after the label has been stripped from the gummer, and deposited thereon, is caused to advance and taking the label with it, ultimately comes to rest in a position such that the said label is in the path of the packet when said packet is forced down between the plates $a$ by the presser 62, as hereafter more fully described.

The movement of the bar 46 is effected by means of levers 49. disposed one at each end of bar 46 and connected at their upper ends to the ends of the said bar, each being pivotally mounted upon the bracket 30. before referred to as carrying the levers 29. The shape of the bracket 30 can be clearly seen on reference to Figs. 10 and 11 from which it will be seen that the lower end of the bracket has an extension $300^1$ which at its end 301. is disposed in a plane parallel with the body of the bracket and which extension carries the lever for the gum distributing roller. The center of this latter lever is somewhat below the center of the lever for the label carrier. The movement of the levers 49 is effected by means of rollers $49^1$ mounted upon the lower ends of said levers which rollers engage a suitable cam race formed in the disk 50 mounted on shaft 6. see Fig. 20. in which figure the side of the bracket 30 is shown, the part $300^1$ being omitted.

Figures 25, 26, 27, 28:
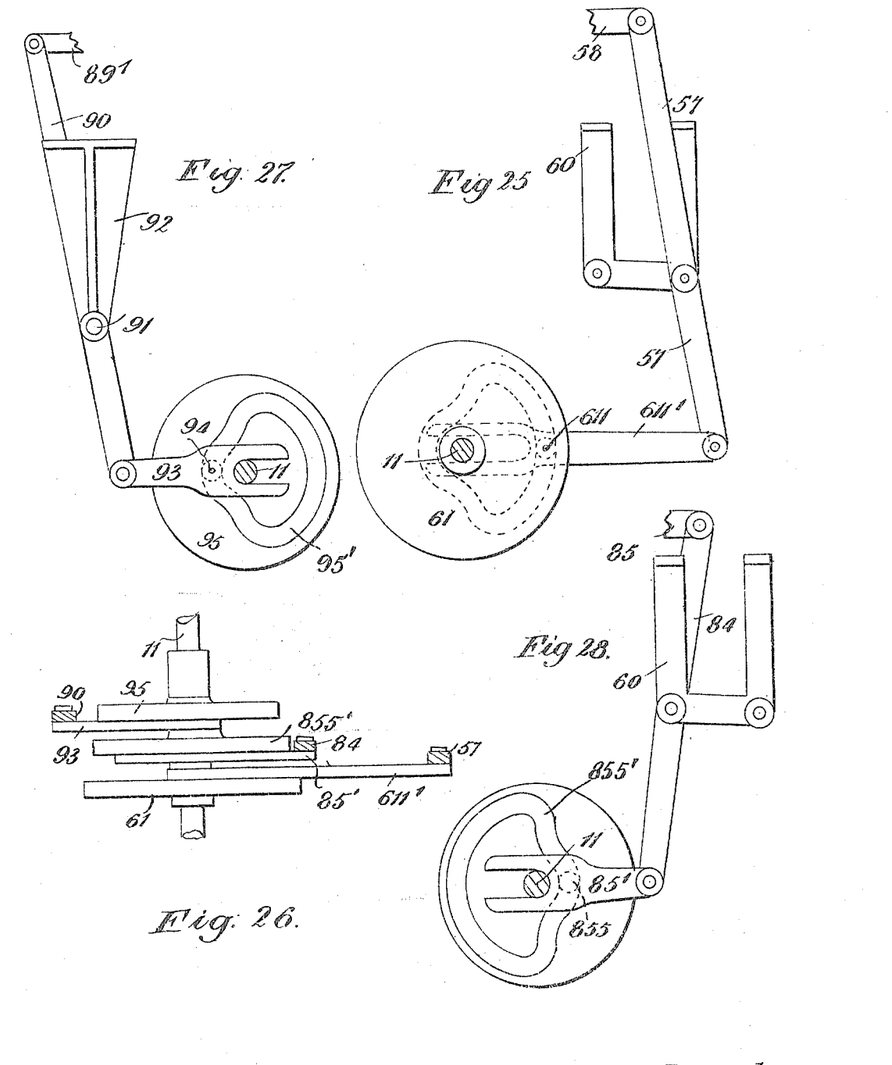
Fig. 25. is a side elevation showing the arrangement of the levers operating the packet slide.
Fig. 26. is a plan the ends of the levers only being shown.
Fig. 27. is a side elevation of the levers on one side for operating the folders.
Fig. 28. is a view of the levers on the opposite that operates the folders.

The packets $y$ are disposed within an open receptacle 500 mounted upon frames $a$ which frames are bolted to the plate 2. and have flanges 51 for the flanges 52 of the receptacle 500. The frames $a$ are spaced just sufficiently far apart to permit a packet to be held by friction between them, that is to say the space between them is somewhat less than the width of the packet and at $a^1$ they are provided with inwardly projecting ribs as shown in Figs. 3, 4, 5, and 7. Slidably mounted upon flanges 53 formed on plates $a$ is a slide 54. the forward end of which as shown in Fig. 3. is reduced in thickness and which slide forms the bottom of the receptacle 500. The slide 54 being reduced in thickness at 55 forms an abutment at 56. which when the slide is pushed forward engages the end of the packet and pushes it out of the receptacle 500 upon its return leaving it between the frames $a$ where it is retained as aforesaid. The movement of the slide 54 is effected by means of the lever 57 connected to the slide by means of a link 58. the lever being fulcrumed at 59 upon the bracket 60. secured to the underside of plate 2. The lever 57 is actuated by means of a race formed in a disk 61. Figs. 25 and 26 with which engages a roller 611 upon rod $611^1$, one end of which straddles the said shaft while the other end has secured to it the end of lever 57 aforesaid. Figs. 1, 2, 6, 7, 25 and 26.

Figure 21:
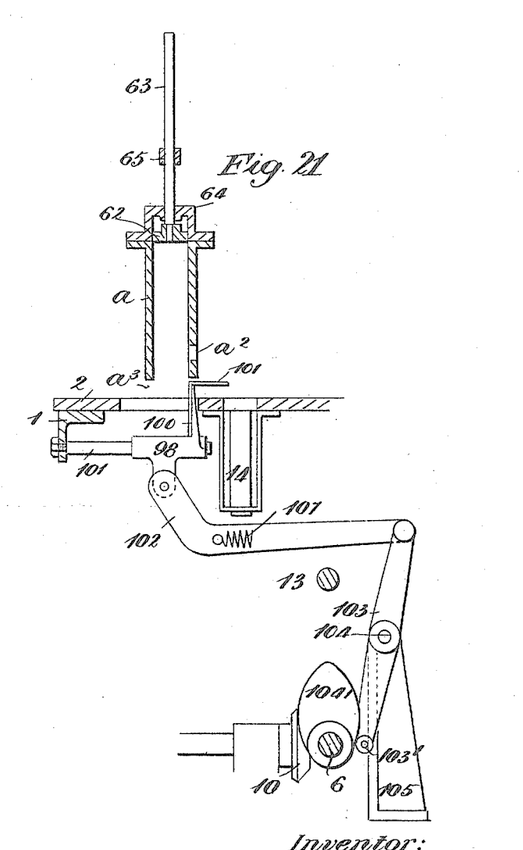
Fig. 21. is a sectional view showing the mechanism for removing the packet after it has been labeled.

62. Figs. 2, 3, 5 and 7 indicate a presser by means of which the packet is pushed downward between the frames $a$ on to the label $x$, which has previously been brought into position by the label carrier before referred to, and upon which carrier the label has been deposited with its gummed surface uppermost. The carrier occupies a position such that the gap therein is in a line with the packet so that when, as will be presently described, the packet is pushed down it will pass through the gap carrying a part of the label with it. For the passage of the carrier an aperture $a^3$ is formed in the side of the rear frame $a$ as clearly shown in Figs. 7 and 21.

The presser 62 is secured to the end of a vertical rod 63. passing through a guide 64. secured to frame $a$ and at its upper end it is secured to the bar 65. carried by the vertical rod 66 which passes through a guide 67. secured to the upper surface of plate 2. and at its lower end it is connected to a link 677, clearly shown in Figs. 1 and 9. in its turn connected to the end of a lever 68 fulcrumed on bracket 69 secured to the frame of the machine and shown by dotted lines in Fig. 2. The lever 68 has upon its outer face a roller 70 shown in dotted lines in Fig. 9. and engaging a track $70^1$ formed in the disk 71 secured to the end of the shaft 11. as shown in Figs. 1 and 2. The track of the roller is of such outline that prior to the withdrawal of the slide 54. the presser 62. is caused to descend and compress the packet slightly and is then raised. It is thus to a certain extent squared up prior to the application of the label, and, therefore, has a better surface for the application of said label. Obviously, when the packet is formed of a rigid body such as a cardboard outer casing or other stiff material the initial compression would not be required. When the packet is thrust down it is supported upon the plate $b^1$ for which an opening is formed in the table 2, and which plate is carried by a vertical rod $b$ passing through a guide $b^3$ secured to the underside of table 2. The support upon its upper surface is provided with a cover or pad of thick felt or other soft material which, when the packet is pressed thereon will permit it to accommodate itself to any unevenness of the surface against which it is pressed thereby securing the more perfect adhesion of the label. The support is retained in its raised position by the spring $b^2$ which surrounds the upper end of rod $b$ and is interposed between the under surface of the said support $b^1$ and the guide $b^3$, in a position such that it is depressed by the packet when it is thrust down by the presser 62. To enable this operation to take place I employ a cam such as $b^5$ Fig. 8. and arrange the lower end of the rod $b$ so that it straddles shaft 11. A roller $b^6$ upon the end of rod $b$ bears against the under surface of the cam $b^5$ so that the rod is quite free to move vertically in the manner just stated. When the rod has been depressed the cam acts upon the roller and holds the support in the required position to enable the folding operations, to be presently described, to be effected, and when such operations are completed the rod is still further depressed so that the packet is brought into a position ready for the operation of the ejecting plate 100 hereafter referred to.

I may in some instances dispense with the arrangement just described in which case the packet would be supported by the prior packet which would remain on the table until the folding operations had been completed.

The support $b^1$ and its operative mechanism are omitted from Figs. 1 and 2 the machine as shown in those figures being adapted for labeling packets in which the goods are placed in a cardboard box.

Figure 4:
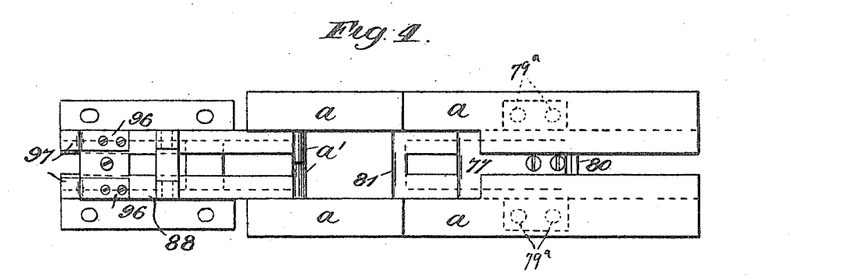
Fig. 4. is a plan of the frames supporting the receptacle for the packets and those for the reciprocating folders.
Figure 5:
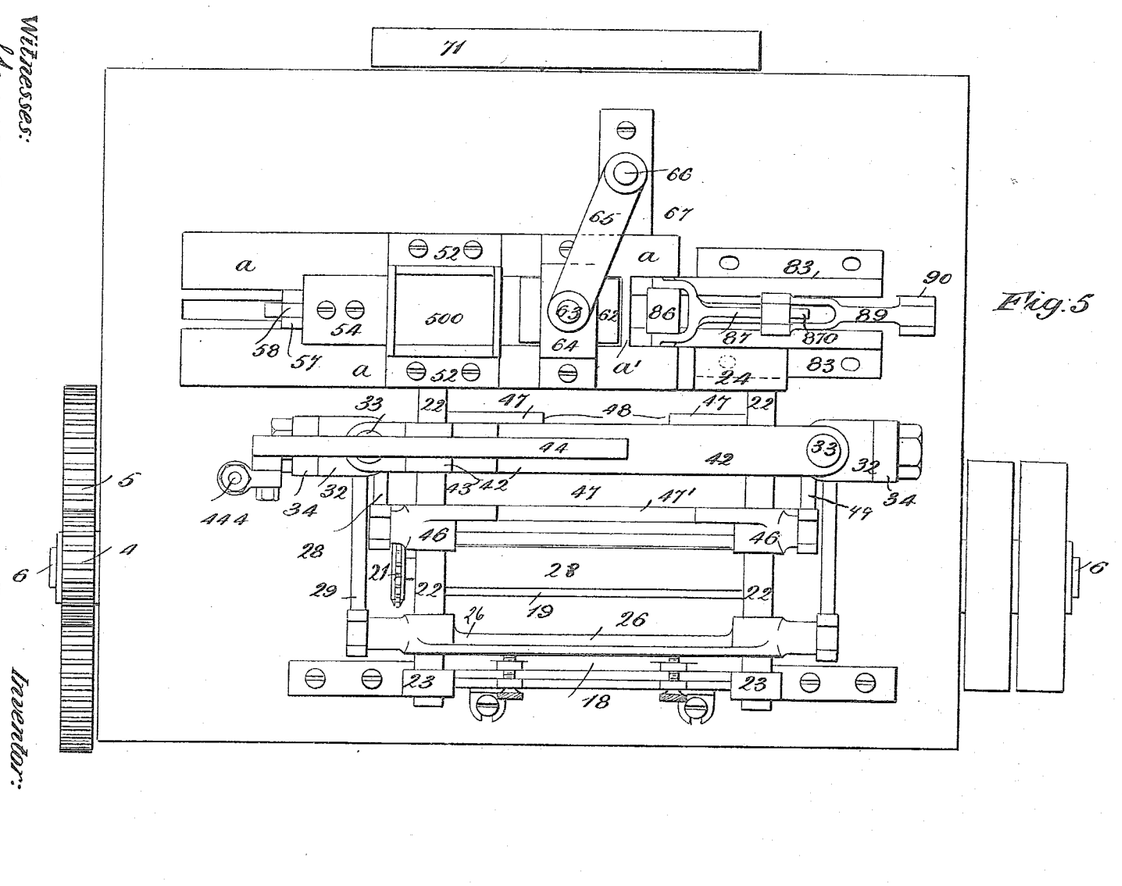
Fig. 5. is a plan.
Figure 15:
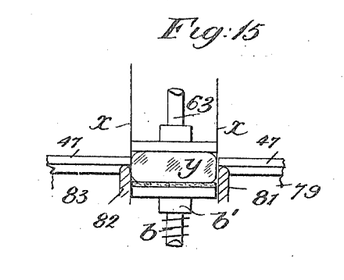
Figure 16:
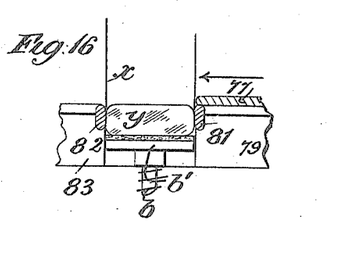
Figure 17:
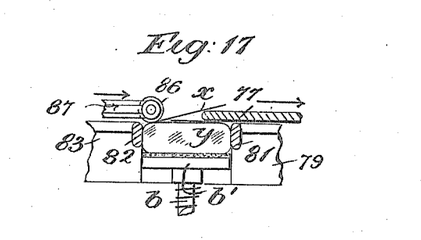
Figure 18:
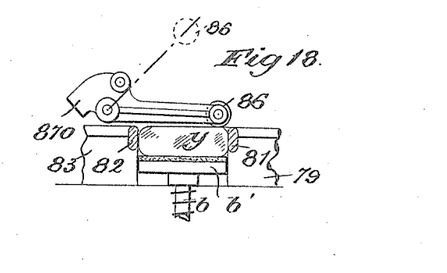
Figure 19:
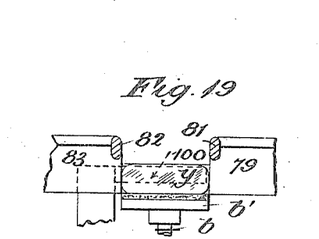
Figure 20:
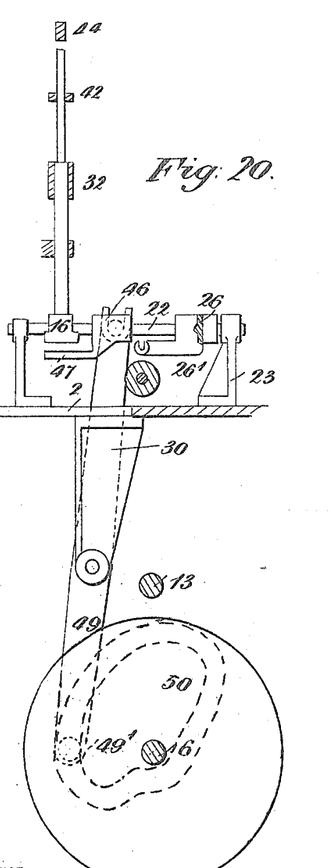
Fig. 20. is a sectional view showing part of the arrangement of the operative mechanism for the label carrier.

The packet in its passage through the carrier turns up one end of the label as shown in Figs. 15 and 16, which end is afterward turned down by means of the plate 76 secured to a slide 77, running on guides 78 forming part of the frame 79. secured to the upper surface of plate 2. Figs. 4, 16 and 17. As shown in Figs. 3 and 4 and 14 to 19, the frame 79 is provided at its ends with cross pieces 80, 81, the latter 81 serving in conjunction with a similar cross piece 82 formed integral with a second frame 83 also secured to the plate 2 and arranged in line with the first frame, as a folder for folding the two first folds on the label and for retaining the packet during the subsequent folding operations, see Figs. 13 to 18. The frames 79, 83, are disposed between the frames $a$ before referred to. The movement of the folder is effected by means of a lever 84 fulcrumed on the bracket 60 as shown in Fig. 1. and 28. to which bracket reference has been previously made in connection with the slide 54 for removing the packet from the magazine. The upper end of the lever is connected by means of a short link 85 as shown in Fig. 3. with the folder and its lower end has secured to it a rod $85^1$ straddling shaft 11 and operated by a roller 855 shown in Fig. 28, engaging a cam $855^1$ secured to the said shaft.

The operation of the folder will be readily understood on reference to Figs. 15 and 16 in which the label $x$ is shown with its ends upstanding, the label carrier and presser being withdrawn. The folder in its forward movement comes into contact with the shorter upstanding end of the label and turns it down on to the packet to which it adheres by reason of its gummed surface as aforesaid. The opposite end of the label is folded down by means of a roller 86 carried in the forked end of the lever 87 pivotally mounted upon the slide 88 running upon the guide 89 formed on the inner surfaces of the frame 83. The lever has pivotally secured to it at a point somewhat to the rear of its point of attachment to the slide, a link $89^1$ see Figs. 1, 2, 3, 5, 6, 17 and 18. The link at its outer end is connected to the upper end of a lever 90 fulcrumed at 91 to the bracket 92 shown in Figs. 1, 2, and 27. The lever is connected at its lower end to a rod 93 straddling shaft 11, and carrying a roller 94, Figs. 26 and 27. which engages a slot $95^1$ in cam 95. By reason of the arrangement of the points of attachment of the lever 87 to the slide, and the link 89 to the lever 87, as the pressure of the lever 90 is exerted to push the slide inward, the lever 87. is brought into a horizontal position with the roller bearing upon the label which is thus pressed against the packet see Figs. 17 and 18. when its further radial movement is thus checked, the continued pressure causing the slide to move forward rolling the label down on to the packet. The return movement of the lever 90 causes the lever 87 to be raised into its former position with the roller clear of the packet prior to the backward movement of the slide 88. It is evident the movement or non-movement of the lever will be dependent upon the friction between the respective surfaces of contact of the roller or folder lever and the slide 88. Should the former be in excess of the latter it is obvious that the lever will remain in a position clear of the label while the slide is advanced. In order to avoid this I may provide the slide with a drag such as that shown in Fig. 3. and which comprises a spring 96 secured to the upper surface of the slide 88 and carrying a block of metal or other material 97 bearing against the upper surface of one of the guides for slide 88. It will be seen on reference to the drawings that the lever 87 is provided at its base with a radial extension 870, which extension when the said lever is in its raised position as shown in Figs. 1 and 3. passes through an opening in the top portion of the slide and comes into contact with the upper portion of said slide. This extension forms a stop for the lever and its contact with the slide affords a resistance enabling the said slide to be drawn backward at the same time offering no impediment to the radial movement of the folding lever 87.

With a view to allowing for variation in the length of the packets, such for example as those that would arise when the machine is primarily designed to label packets containing for example tea, having large leaves, and is used for labeling packets containing tea having small leaves, or a large portion of tea dust, I may secure either or both of the frames 79 and 83 to the plate 2 in a manner such that it is capable of slight longitudinal movement say $\frac{1}{8}$ to $\frac{3}{16}$ of an inch. The frame under these circumstances would at each reciprocation of the slide 88 be advanced and withdrawn, the amount of forward movement being limited by the packet with which the end of the frame would come into contact.

In order that the longitudinal movement of the frame 79 may take place in the manner above described, instead of securing it immovably by means of bolts to the base plate 2, I provide elongated holes for the bolts as shown in dotted lines at $79^a$ Fig. 4. By this means the frame, although secured against lateral displacement, is able to make the slight longitudinal movement necessary to compensate for any slight variation in the length of the packet.

During the folding operations the packet is supported either upon the support $b^1$ or upon the packet previously labeled as aforesaid. When the labeling is completed the support is removed and the packet lowered so that it can be removed through the aperture in the front frame $a$. To permit the passage of the labeled packet an opening is formed at $a^2$ in the side of the outer frame $a$ as shown in Figs. 1 and 7.

The removal of the packet is effected by means of the slide 98 supported by a rod 99. secured to the frame of the machine as shown in Figs. 1 and 7. The slide is provided with a vertical member carrying a plate 100. The plate passes through an aperture $a^3$ in the rear frame $a$ the height of the plate being such that its upper surface is on a level with the top of the undermost packet. The plate is provided with a horizontal rearwardly extending portion 101, which when the support $b^1$ is not employed comes under the superposed packet and prevents it falling when the lowermost packet is removed.

The movement of the slide 98 is effected by means of the rod 102 one end of which is secured to said slide and at its opposite end the rod is secured to one end of a lever 103 see Figs. 1, 2, 3 and 7. The lever 103 is provided with a roller $103^1$ and is fulcrumed at 104 to a bracket 105 Figs. 2. and 21, secured to the end of the central transverse member of frame 1. The lever 103 is operated by a cam $104^1$ secured to the cam shaft 6. A spring 107 is provided for keeping the roller of the lever 103 in contact with the cam.

Having now particularly described and ascertained the nature of my said invention and in what manner the same is to be performed I declare that what I claim is:

1. In a labeling machine the combination of a receptacle for labels, a gummer for picking up the labels, a stripping plate within said gummer, a source of supply for gum, means for applying gum to the gummer, a perforated carrier upon which the label is placed by the gummer, a receptacle for the packet or goods to be labeled, a presser, means for removing the goods from the receptacle and placing them in the path of the presser by which they are thrust downward through the perforation in the label carrier partly encircling the goods and causing the ends of the label to be turned into a vertical position, horizontally reciprocating folders for turning down the upstanding ends of the label and means for removing the goods.

2. In a labeling machine the combination of a receptacle for labels, a gummer formed in two parts one of which picks up and applies the gum to the label while the other strips it from the gummer, a source of supply for the gum, means for applying it to the gummer, a perforated carrier upon which the label is deposited by the gummer, a receptacle for the packets or goods to be labeled, a presser, means for removing the goods and placing them in the path of the presser by which they are subjected to pressure and then thrust downward through the perforation in the carrier partly encircling the goods and causing the ends of the packet to be turned into a vertical position, means for holding the goods, and horizontally reciprocating folders acting upon the upstanding ends of the label, and means for removing the goods.

3. In a labeling machine the combination of a receptacle for labels, a gummer formed in two parts one of which picks up and applies the gum to the label while the other strips it from the gummer, a source of supply for the gum, means for applying it to the gummer, a perforated carrier upon which the label is deposited by the gummer, a receptacle for the packets or goods to be labeled, a presser, means for removing the goods and placing them in the path of the presser by which they are subjected to pressure and then thrust downward through the perforation in the carrier partly encircling the goods and causing the ends of the packet to be turned into a vertical position, means for holding the goods such means being capable of longitudinal movement and horizontally reciprocating folders acting upon the upstanding ends of the label, and means for removing the goods.

4. In a labeling machine the combination of a receptacle for labels, a gummer formed in two parts one of which picks up and applies the gum to the label while the other strips it from the gummer, a source of supply for the gum, means for applying it to the gummer, a perforated carrier upon which the label is deposited by the gummer, a receptacle for the packets or goods to be labeled, a presser, means for removing the goods and placing them in the path of the presser by which they are subjected to pressure and then thrust downward through the perforation in the carrier partly encircling the goods and causing the ends of the packet to be turned into a vertical position, means for holding the goods such means being capable of longitudinal movement and horizontally reciprocating folders acting upon the upstanding ends of the label one of said folders comprising an arm having a roller said arm being capable of radial movement and means for removing the goods.

5. In a labeling machine the combination of a receptacle for labels, a gummer formed in two parts one of which picks up and applies the gum to the label while the other strips it from the gummer, a source of supply for the gum, means for applying it to the gummer, a perforated carrier upon which the label is deposited by the gummer, a receptacle for the packets or goods to be labeled, a presser, means for removing the goods and placing them in the path of the presser by which they are subjected to pressure and then thrust downward through the perforation in the carrier partly encircling the goods and causing the ends of the packet to be turned into a vertical position, means for holding the goods such means being capable of longitudinal movement and horizontally reciprocating folders acting upon the upstanding ends of the label one of said folders comprising an arm having a roller said arm being capable of radial movement, means for increasing the friction between the sliding member of said folder and its support, and means for removing the goods.

In witness whereof I have affixed my signature in the presence of the two undersigned witnesses.

EDWARD COLSTON LOVELL.

Witnesses:
 JOHN HENRY JACK,
 EDMUND HENRY HASKED.